United States Patent
Gras et al.

(10) Patent No.: US 7,004,664 B2
(45) Date of Patent: Feb. 28, 2006

(54) CONNECTING ELEMENT

(75) Inventors: David Alonso Gras, Sant Cugat del Vallés (ES); Juan M. Dona Contero, Rubi (ES)

(73) Assignee: Fico Cables, S.A., Rubi (ES)

( * ) Notice: Subject to any disclaimer, the term of this patent is extended or adjusted under 35 U.S.C. 154(b) by 121 days.

(21) Appl. No.: 10/276,510

(22) PCT Filed: Jun. 8, 2001

(86) PCT No.: PCT/EP01/06553

§ 371 (c)(1),
(2), (4) Date: Dec. 6, 2002

(87) PCT Pub. No.: WO01/94799

PCT Pub. Date: Dec. 13, 2001

(65) Prior Publication Data

US 2004/0007884 A1 Jan. 15, 2004

(30) Foreign Application Priority Data

Jun. 8, 2000 (DE) .......................... 100 28 361

(51) Int. Cl.
*F16C 11/06* (2006.01)

(52) U.S. Cl. ...................... 403/133; 403/135
(58) Field of Classification Search ................. 403/133, 403/135
See application file for complete search history.

(56) References Cited

U.S. PATENT DOCUMENTS

| | | | |
|---|---|---|---|
| 3,776,649 A | 12/1973 | Kemezys | |
| 5,265,495 A | 11/1993 | Bung et al. | |
| 5,290,120 A | 3/1994 | Osterfeld et al. | |
| 5,676,485 A | * 10/1997 | Lee | ............................. 403/135 |
| 5,758,986 A | * 6/1998 | Kraps | ......................... 403/135 |
| 6,505,989 B1 | * 1/2003 | Pazdirek et al. | ............. 403/135 |

FOREIGN PATENT DOCUMENTS

| | | |
|---|---|---|
| DE | 196 40 504 | 4/1998 |
| DE | 198 12 721 | 10/1999 |
| DE | 199 18 911 | 11/2000 |
| EP | 0 806 577 | 11/1997 |
| GB | 2 235 961 | 3/1991 |
| JP | 11048923 | 2/1999 |
| WO | 00/65245 | 11/2000 |

* cited by examiner

*Primary Examiner*—John R. Cottingham
(74) *Attorney, Agent, or Firm*—Renner, Otto, Boisselle & Sklar, LLP

(57) ABSTRACT

The present invention provides a connecting element for releasably connecting a first (10) and a second component (20) particularly a lever with another lever or a brake pedal with the plunger rod in a motor vehicle. The connecting element comprises a connecting means (40, 60) which is attached to or part of a second component (20) and a dome shaped sledge (50) attached to a first component (10) wherein the dome shaped sledge (50) is latched in the connecting means (40, 60) by sliding from an assembling in a fastening position. Additionally, a connecting element is provided comprising preferred a two-piece connecting means (40, 60) attached to a pedal (20) and a modulator (10), respectively, wherein a sledge frame (60) is releasable latched in a housing (40). The connecting element enables a load transmission parallel to the assembling direction.

13 Claims, 3 Drawing Sheets

CONNECTING ELEMENT

Figure 1:
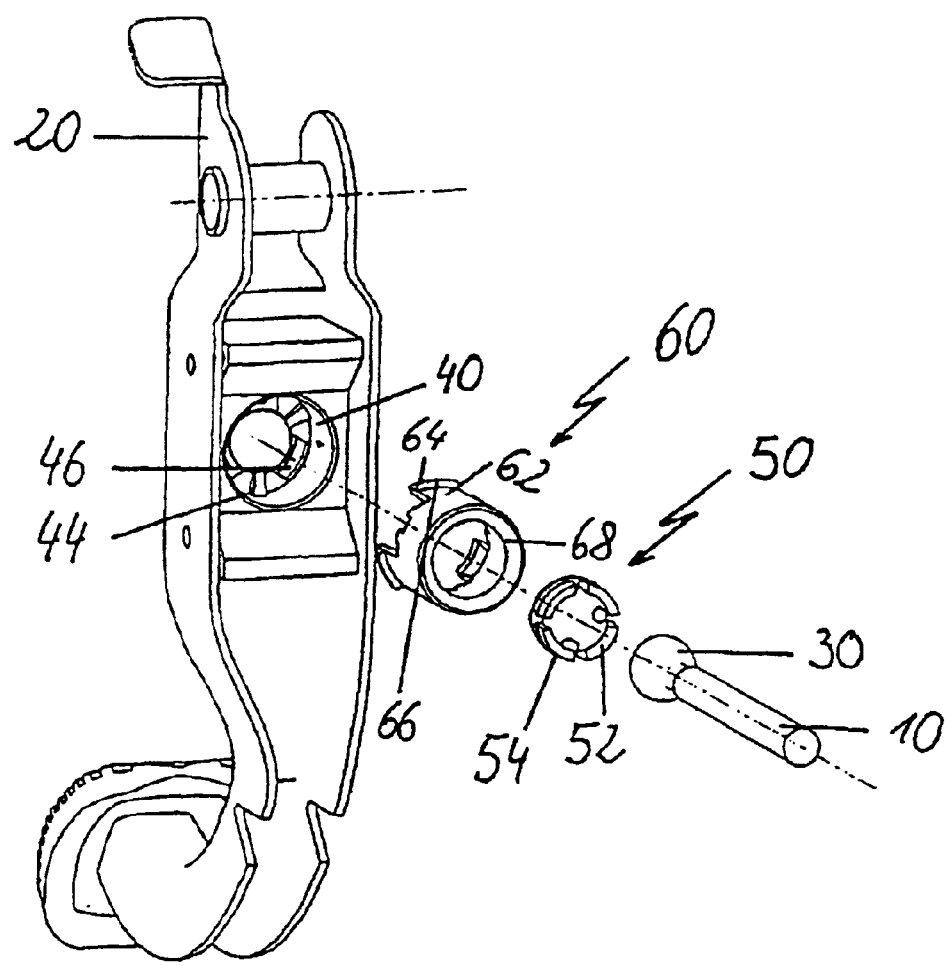

This application is a national phase of International Application No. PCT/EP01/06553 filed Jun. 8, 2001 and published in the English language.

1. TECHNICAL FIELD

The present invention relates to a connecting element for releasable connecting a first component with a second component, for instance a modulator with an operating element. In particular, the present invention relates to a connecting element for releasable connecting a brake linkage with a pedal in a vehicle.

2. PRIOR ART

Linked and releasable connecting of two components by means of an appropriate connecting element is a problem in many fields of mechanical engineering. The construction of vehicles is such a field. Here, usually the applied force to the brake or clutch pedal and the thereby generated torque is transmitted via a movably attached linkage of bars or modulator to the brake or clutch system, respectively. Such releasable connections have the following advantages: The moving direction of the two connected components can be turned round, the transmitted torques and forces can be changed by exploiting the lever principle and the aspect of safety is taken into account by indirectly operated technical elements. Airplane construction or the general mechanical engineering are further fields of application in which releasable connections of two movable components are required.

The following essential requirements have to be fulfilled especially because of the application of connecting elements in the field of vehicle construction. In the case of using the connecting element for connecting the brake pedal with the brake linkage a stable, long wearing and lasting construction is necessary which transmits considerable cyclic loading of compressive and tensile stresses over the whole working life of a motor vehicle. The stability is realized on the one hand by cooperating positive and non-positive connections and on the other hand by using appropriate materials as for instance plastic materials with reinforcing elements.

Furthermore, it is desirable, that the connection produced by the connecting element is connectable and again releasable with low technical and time effort. This is only possible if the connecting element consists of components with limited constructive complexity. In consideration of the mentioned aspects the production costs as well as the later assembling cost during assembly and disassembly of the connecting element and the use of the connecting element, respectively, can be reduced whereby a profitable and technically useful connecting element is provided.

The prior art provides connecting elements of different embodiments which are characterized by a certain stability under load which several times exceeds the assembling force for producing the connection.

According to the document DE 198 13 721 a connecting element can comprise for instance the following arrangement. A first component has a spherical head which is received by a dome shaped sled complimentary shaped to the spherical head. During insertion or installation, respectively, of the spherical head in the sled the lateral sides of the sled in the opening region of the spherical cap are pressed apart and are closed again after the spherical head has been completely inserted into the sled. In this way a positive and a non-positive connection between the spherical head and the sled is produced. This sled comprises two resilient extensions at its outside with snapping hook-like projections at their sides opposite to the spherical head. The resilient extensions with the snapping hook-like projections provide a permanent connection and latching with a second component by engaging therein if the sled with the spherical head slides into a second component (receptacle) for producing a definitive connection. The second component circumferentially compasses the sled and prevents in that way a bending up of the dome shaped sled and a disengaging of the spherical head. The connection between sled and second component is facilitated by a suitably shaped female element in the second component. In that way, a connection with a simultaneous engaging of the connection is produced by moving the spherical head in the direction of the dome shaped sled. The connecting element withstands mechanical loads acting perpendicular to the assembling direction of the connecting element whereby these mechanical loads can by far exceed the mechanical assembling effort.

A further development of the until then known and explained connecting elements provides the document DE 199 18 911. In this connecting element the resilient extensions with a snapping hook-like projection of the sled are shaped so that they stick out on one side of the second component, i. e. project when the sled is set in and engaged in the second component. Nevertheless, the sled can be disengaged from the second component by manually pressing the projecting ends without using any additional tools. Thus, a connecting element is provided which can be manually assembled as well as released and although withstands high mechanical loading.

Furthermore, the sled provides simultaneously fastening and latching means by its dome shaped female element for the spherical head of the first component and by the resilient extensions for latching in the second component. The material of the sled is elastically deformable in order to enable the function of the resilient extensions. The mechanical deformability additionally however causes that the sled deforms under the influence of mechanical loading. Though, the sled is deformed because the mechanical loading of the connecting element acts perpendicular to the assembling direction as described above in the prior art, nevertheless that does not cause a disengagement of the spherical head from the sled and thereby a failure of the connecting element.

However, it has to be noted that only forces perpendicular to the assembling direction appear during use of the known connecting elements, described before. Strictly speaking, the load acts during the intended use substantially perpendicular to the assembling direction of the first component which is moved together with the dome shaped sled into the second component during assembling. Thus, the holding forces in assembling direction have not to be and are not high in the known connecting elements. Additionally, the construction of the known connecting elements is unsuitable for mechanical loads acting in assembling direction because their elastical deformability of the sled material would lead to a fast wear of the bearing area and therefore to a disengagement of the spherical head.

Finally, the snapping hook-like latching means perform the supporting parts of the connecting element during acting mechanical loading in assembling direction. However, these supporting areas are too small to withstand permanent tensile or tensile/compressive cyclic loading.

It is therefore the problem of the present invention to provide a connecting element for two components that permanently withstands mechanical loading parallel to the assembling direction. Thereby the connecting element is to be of simple construction and made of low-cost materials.

A further problem related to the known connecting elements and solved by the present invention is that the connecting element comprises high stability and is to be nevertheless easily releasable without negatively affecting the stability and working life.

3. SUMMARY OF THE INVENTION

The problems underlying the present invention are solved by a connecting element according to the invention.

In detail, the problem underlying the present invention is solved, in one embodiment, by a connecting element for connecting a first component with a second component wherein the connecting element comprises a connecting means connected with the second component and a dome shaped sled arranged in said connecting means displaceable from an assembling position to a fastening position. Said dome shaped sled is formed such that it can receive a fastening end of the first component and that it supports and latches itself at least with partial areas of the edge of the dome shaped sled within the connecting means when displaced in the fastening position with the received fastening end.

The fastening end of the first component is preferably spherically complementary shaped to the dome shaped sled so that in the fastening position of the dome shaped sled the fastening end is positively connected and movably hold.

The wall at the open end of the dome shaped sled is preferably divided into at least two wall sections which are radially spaced apart from the received fastening end in assembling position and furthermore form latching means in the connecting means which are configured lever-like resilient and their radial outerlying edges are shaped sharp-edged.

Preferably, the connecting means is ring-shaped for receiving and latching the dome shaped sled, and comprises a snapping hook-like projection at its radial inner wall for latching the resilient wall sections of the dome shaped sled.

Furthermore, an aspect of the invention provides a connecting element for connecting a pedal with a modulator, in particular in motor vehicles, comprising a connecting means with a housing and a sled frame, the housing of which is connected with a pedal and the sled frame of which is connected with a modulator, wherein the sled frame can be releasable connected with the housing by at least one latching means and one unlatching means and said housing is connected with said pedal in the connected condition.

The wall of the sled frame at the end turned to the housing is preferably divided in at least two lever-like resilient wall sections which comprise at least one unlatching means.

The latching means is preferably formed by a snapping hook at the radial outer wall of the wall section and the unlatching means is formed by a portion of the wall section which extends over the snapping hook lengthwise with the sled frame.

The sled frame is received by an opening on one side of the housing whereas at least two openings are positioned on a side opposite to the opening for receiving the wall sections of the sled frame. Furthermore, the housing comprises at least one fastening means for fastening on the pedal.

The edges of the openings in the housing for receiving the latching means are preferably shaped sharp-edged.

4. SHORT DESCRIPTION OF THE DRAWINGS

Figure 2:
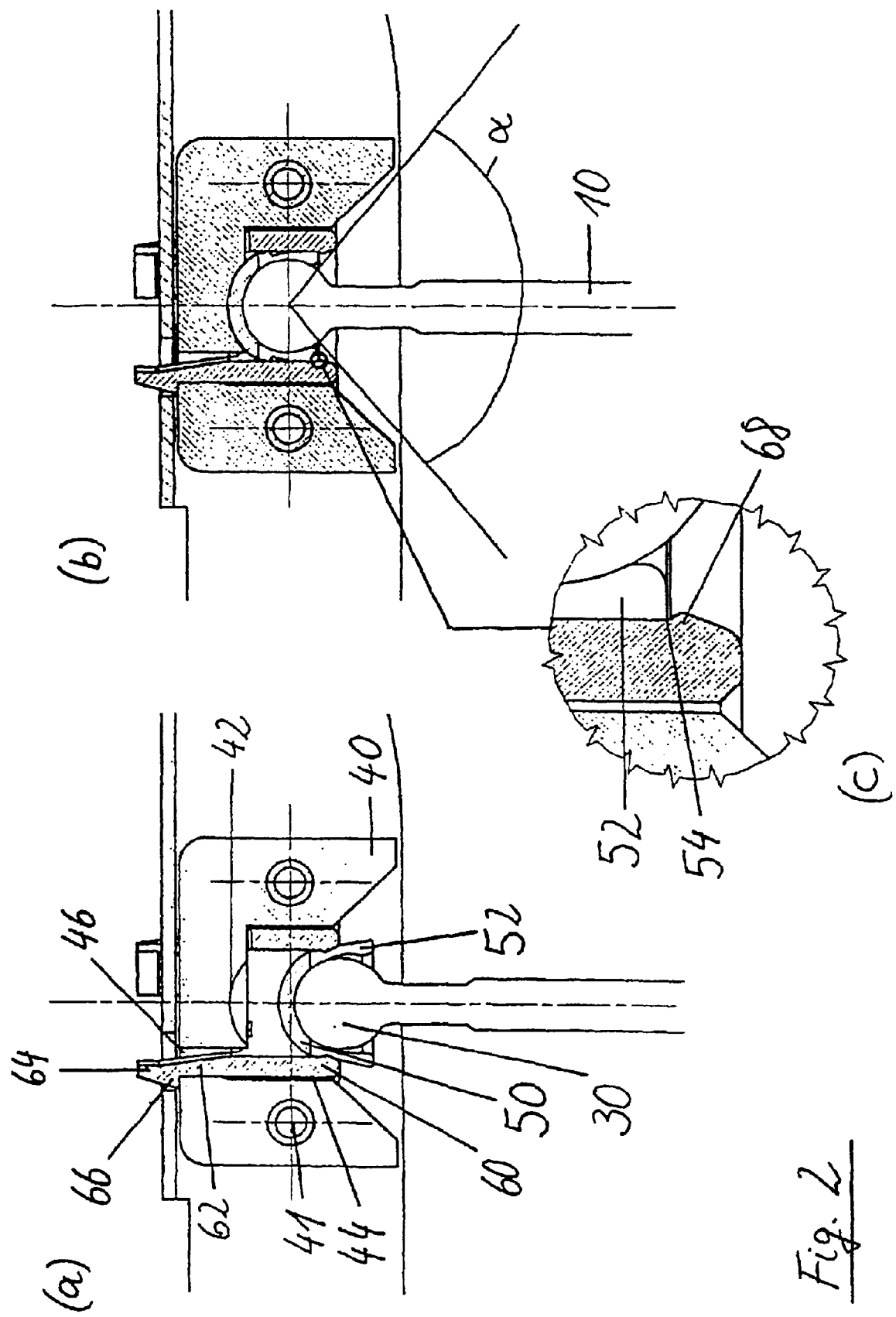

At present, preferred embodiments of the present invention are exemplarily shown in the drawing:

FIG. 1 The single components of the connecting element according to the present invention;

FIG. 2(*a*) a sectional drawing of the connecting element according to the present invention corresponding to a preferred embodiment with a dome shaped sled in assembling position;

(*b*) *a sectional drawing of the connecting element according to the present invention of FIG. 2a with a dome shaped sled in the fastening position;*

(*c*) *a cut-out enlargement of the preferred latching means of the dome shaped sled according to the present invention at the radial inner wall of the sled frame; and*

Figure 3:
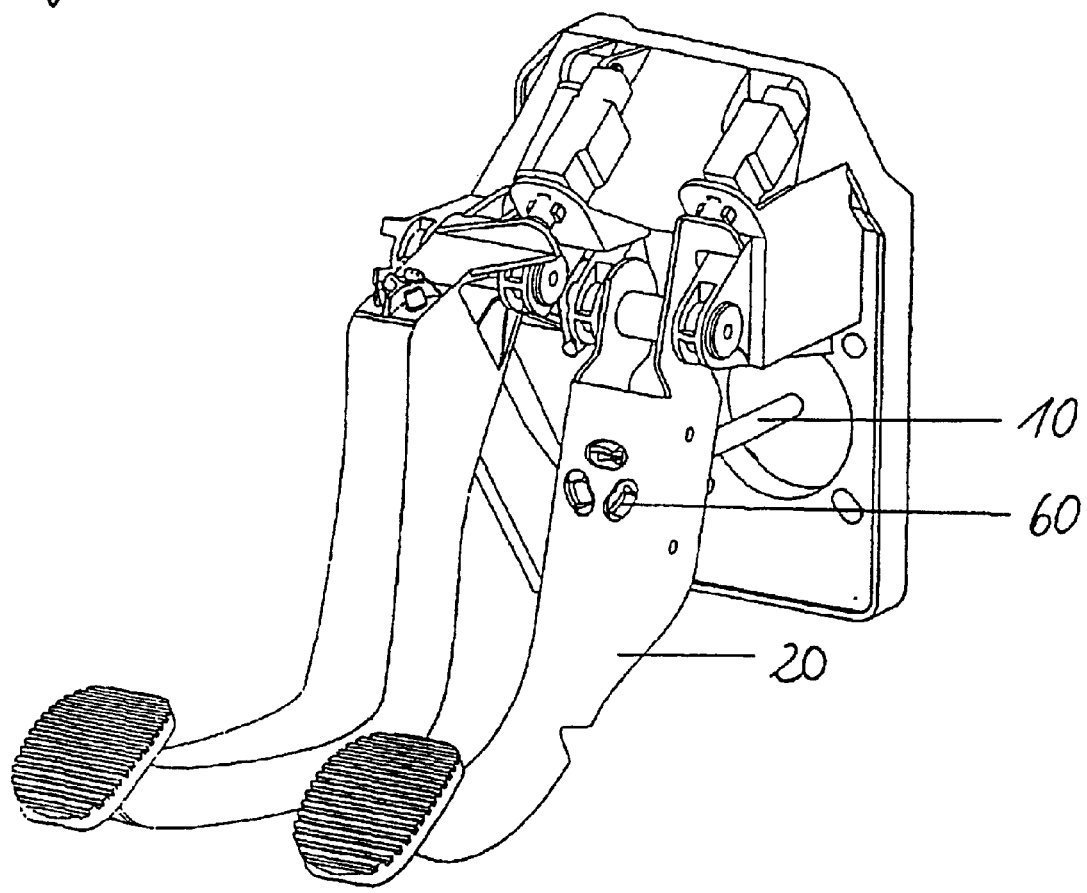

FIG. 3 a modular pedal system of a motor vehicle wherein the brake pedal is connected with the brake linkage via the connecting element according to the present invention.

In the following, preferred embodiments of the invention are in detail described with reference to the drawing.

5. DETAILED DESCRIPTION OF THE INVENTION

Referring to FIG. 1, the connecting element 40, 50, 60 according to the present invention for connecting a first component 10 (preferred a brake or a clutch linkage) with a second component 20 (preferred a pedal) comprises a connecting means 40, 60 and a dome shaped sled 50 arranged inside said connecting means 40, 60.

The connecting means 40, 60 is according to the invention preferably provided in two-part form and comprises a housing 40 connected to or integrated into the second component 20, and a sled frame 60 cooperating with the housing 40. Corresponding to the first embodiment according to the present invention it is also possible to design the connecting means 40, 60 so that it can latchably receive the dome shaped sled 50.

It is a further possible embodiment to integrate into the connecting means 40, 60 in the second component 20 so that it can directly receive and engage the dome shaped sled 50.

According to the present invention the sled frame 60 preferably comprises a ring-shaped structure for receiving the dome shaped sled 50. The ring-shaped structure of the sled frame 60 is characterized by a snapping hook-like projection 68 at its radial inner wall which serves for latching the dome shaped sled 50 according to the present invention which will be described in detail in the following.

According to the present invention the dome shaped sled 50 preferably comprises a closed end and an open end. Besides, the wall of the open end of the dome shaped sled 50 is divided into at least two wall sections 52 (preferably 4) which serve as latching means 52 in the sled frame 60. In order to realize the function of the latching means 52 the wall sections 52 are preferably configured lever-like resilient and their radial outer edges 54 are shaped sharp-edged.

The fastening end 30 of the first component 10 is preferably spherically complementary shaped to the closed end of the dome shaped sled 50. Thereby, in the assembling position the front part of the spherical fastening end 30 is completely encompassed by the dome shaped sled 50, as can be seen best in FIG. 2*a*. In the fastening position (FIG. 2*b*), the first component 10 is positively connected with the connecting means 40, 60 via the fastening end 30 and thereby also pivotable around the solid angle α. Because of the pivotability around the solid angle α, it is possible to compensate tolerances in the alignment of the first component 10 with respect to the second component 20 without impairing the function of the provided connection according to the present invention.

Furthermore, the outer diameter of the open end of the dome shaped sled 50 exceeds the inner diameter of the ring-shaped provided sled frame 60 in the assembling position (cf. FIG. 2a) and the lever-like resilient formed wall sections 52 are laterally spaced apart from the fastening end 30 inserted into the dome shaped sled 50.

By displacing the dome shaped sled 50 from the assembling position in the fastening position (see FIG. 2b), the lever-like resilient formed wall sections 52 perform the following functions: The wall sections 52 are pressed in the direction of the spherically shaped fastening end 30 by the inner side of the ring-shaped provided sled frame 60 whereby the wall sections 52 of the dome shaped sled 50 encompass and secure the fastening end 30. Simultaneously, the lever like resilient formed wall sections 52 press with their spring force caused by the elasticity of the material against the inner wall of the ring-shaped provided sled frame 60. If the dome-shaped sled 50 is positioned in the fastening position (FIG. 2b), the wall sections 52 latch the dome shaped sled 50 in the ring-shaped provided sled frame 60 (see FIG. 2c) by latching behind the snapping hook-like projection 68.

A release of the dome shaped sled 50 from the ring-shaped sled frame 60 opposite to the assembling direction is prevented by the snapping hook-like projection 68 in the sled frame 60. A release of the dome shaped sled 50 from the sled frame 60 in assembling direction is prevented by a preferably complementary to the dome shaped sled shaped vault 42 of the housing 40 according to the present invention. Thus, the housing 40 provides a limit stop for the dome shaped sled 50 so that if built into the connecting means 40, 60, it cannot be released from the ring-shaped sled frame 60 without damaging the connecting element. This function can also be assured by a suitable formation of the sled frame 60.

The connecting element 40, 50, 60 preferably provides a non-positive as well as a positive connection between the first component 10 and the second component 20 by means of a dome shaped sled. Additionally, the connection of two components within a solid angle a is enabled by the spherical complementary formation of the fastening end 30 to the dome shaped sled 50 (see FIG. 2b). In this way, a divergent alignment of two components with respect to each other can be compensated by the connecting element.

Furthermore, according to a further preferred embodiment the present invention provides a connecting element for releasably connecting a pedal 20 and a modulator 10, in particular in motor vehicles (see FIG. 3). The importance of such a connecting element according to the present invention follows from the fabrication of motor vehicles from single modules. For instance the brake and clutch pedal, shown in FIG. 3 represent a pedal-module which is delivered to the automobile manufacturer by a special supplier. For example, in order to connect the brake pedal 20 with the brake system via a modulator 10, a pedal with a releasable connecting element 40, 50, 60 according to the present invention and according to the further preferred embodiment is delivered. The brake system is connected with the pedal 20 via the connecting element 40, 50, 60 and the modulator 10, wherein this connection can be again released in case of a damage or repair.

The preferred connecting element 40, 50, 60 for connecting a pedal 20 and a modulator 10 according to the present invention is composed of a two-part connecting means 40, 60 which comprises a housing 40 and a sled frame 60. Thereby, the housing 40 is firmly connected with the pedal 20 and the sled frame 60 is connected with the modulator 10 via a suitable coupling means 30, 50.

The releasable connection between pedal 20 and modulator 10 is realized by the sled frame 60 which cooperates with the housing 40. However, it is also possible to directly form the housing 40 in the pedal 20 and to directly connect the sled frame 60 with the modulator 10.

Corresponding to a preferred embodiment the sled frame 60 is ring-shaped provided and comprises at its one end an opening for receiving the coupling means 30, 50. The wall at the end of the ring-shaped sled frame 60 opposite to the opening for receiving the coupling means 30, 50 is divided in at least two lever-like resilient sections 62. According to FIG. 2a, the wall sections 62 comprise snapping hook-like projections 66 at its radial outer wall which serve as latching means 66 in the housing 40. The snapping hook-like projections 66 can vary in its shape as long as they form a positive connection with the functionally cooperating wall of the housing 40 which releasably connects the housing 40 and the sled frame 60.

Unlatching means 64 are formed by extending the wall section 62 over the snapping hook-like projection 66 in axial direction of the ring-shaped provided sled frame 60. The unlatching means 64 represent resilient lever by which the snapping hooks 66 can be released from their engaging position. Dependant on the material of which the sled frame 60 is made, a tool has to be used for actuating the unlatching means 64 or it can be done manually.

The housing 40 comprises on one side an opening 44 for receiving the sled frame 60. Preferably according to the present invention, the opening 44 is only so deep that it can completely receive the sled frame 60. At least two openings 46 for receiving the wall sections 62 of the sled frame 60 are formed on the side of the housing 40 opposite to the opening 44. The latching means 66 of the sled frame 60 are latched at the sharp-edged shaped radial outer edges of the opening 46. The unlatching means 64 preferably according to the present invention extends over the housing 40 and, if required, over the corresponding part of the pedal 20 so that they can be taken and actuated manually or with a tool.

By the above described formation of the housing 40 and the sled frame 60 a connection between pedal 20 and modulator 10 is realized which can only be released by actuating the unlatching means 64.

The housing 40 comprises appropriate fastening means 41 for fastening the housing 40 in the pedal 20.

According to the preferred embodiment of the present invention the components of the connecting element are made of stiff plastic materials as for example polyamide. It is also possible to manufacture the single components from other materials and thereby realizing the function of the connecting element.

LIST OF REFERENCE NUMBERS 10 first component, modulator
20 second component, pedal
30 fastening end
40 housing
41 fastening means
42 vault
43 opening for receiving the sled frame
46 opening for receiving the wall sections 62 of the sled frame 60
50 dome shaped sled
52 wall sections of the dome shaped sled
54 edges of the dome shaped sled
60 sled frame
62 wall sections of the sled frame 60

64 unlatching means of the sled frame
66 latching means of the sled frame
68 snapping hook-like projection in the sled frame
α solid angle

What is claimed is:

1. A connecting element for connecting a first component with a second component comprising:
   a. a connecting means connected to the second component;
   b. a dome shaped sled arranged in said connecting means after being displaced from an assembling position to a fastening position and for receivably containing a fastening end of the first component, wherein
   c. said dome shaped sled has a lower edge that latches with an inner edge of the connecting means and is retained thereby when displaced in the fastening position and containing the received fastening end,
   wherein the fastening end of the first component is shaped spherically complementary to the dome shaped sled.

2. The connecting element according to claim 1, wherein an open end of the dome shaped sled in the assembling position is radially spaced apart from the received fastening end and that a wall of the domed shaped sled at the open end of the dome shaped sled is divided into at least two wall sections.

3. The connecting element according to claim 2, wherein the wall sections form latching means in the connecting means, the latching means being resilient levers having sharped-edged radial outer edges.

4. The connecting element according to claim 1, wherein the connecting means is shaped for receiving the dome shaped sled and the inner edge is defined by a snapping hook projection for latching the wall sections.

5. A connecting element for connecting a first component with a second component comprising:
   a. a connecting means connected to the second component;
   b. a dome shaped sled arranged in said connecting means after being displaced from an assembling position to a fastening position and for receivably containing a fastening end of the first component, wherein
   c. said dome shaped sled has a lower edge that latches with an inner edge of the connecting means and is retained thereby when displaced in the fastening position and containing the received fastening end,
   wherein the connecting means includes a sled frame having at least one resilient lever arm with a latching means to engage a housing retained by the second component and an unlatching means.

6. The connecting element according to claim 5, wherein the latching means is formed by a snapping hook defined by a radial outer wall of the sled frame and the unlatching means is formed by a portion of the wall section which extends over the snapping hook in a direction along the longitudinal axis of the sled frame.

7. The connecting element according to claim 5, wherein said housing comprises an opening for receiving said sled frame and on a side opposite to the opening, corresponding openings for receiving the lever arms the sled frame and a fastening means for fastening the housing to the second component.

8. The connecting element according to claim 7, wherein the edges of the openings for receiving the lever arms are shaped sharp-edged to support the latching means.

9. The connecting element according to claim 1, wherein the first component is a modulator and the second component is a pedal.

10. The connecting element according to claim 1, wherein the connecting means includes a sled frame on which the inner edge is formed.

11. The connecting element according to claim 1, wherein the lower edge is defined by segmented portions of walls of the dome shaped sled.

12. The connecting element according to claim 1, wherein upon displacement from the assembling position to the fastening position by insertion of the sled into the connecting means, the lower edge is radially inwardly compressed and latched with the inner edge such that tensile forces directed along a longitudinal axis of the sled by the first component increase a latching force between the lower edge and the inner edge.

13. In combination, a vehicle and a connecting element according to claim 1, wherein the first component is a modulator and the second component is a pedal of the vehicle.

* * * * *